(12) United States Patent
Chen et al.

(10) Patent No.: US 11,876,563 B2
(45) Date of Patent: Jan. 16, 2024

(54) OPTICAL SIGNAL PROCESSING METHOD, CONTROL UNIT, OPTICAL TRANSMISSION UNIT AND STORAGE MEDIUM

(71) Applicant: ZTE CORPORATION, Shenzhen (CN)

(72) Inventors: Weizhang Chen, Shenzhen (CN); Zhiyong Zhao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/904,730

(22) PCT Filed: Jun. 11, 2021

(86) PCT No.: PCT/CN2021/099816
§ 371 (c)(1),
(2) Date: Aug. 22, 2022

(87) PCT Pub. No.: WO2021/254281
PCT Pub. Date: Dec. 23, 2021

(65) Prior Publication Data
US 2023/0075025 A1    Mar. 9, 2023

(30) Foreign Application Priority Data

Jun. 15, 2020 (CN) .......................... 202010543111.2

(51) Int. Cl.
*H04B 10/556* (2013.01)
*H04B 10/25* (2013.01)
(Continued)

(52) U.S. Cl.
CPC ....... *H04B 10/556* (2013.01); *H04B 10/0773* (2013.01); *H04B 10/0779* (2013.01);
(Continued)

(58) Field of Classification Search
CPC .............. H04B 10/556; H04B 10/2589; H04B 10/0773; H04B 10/0779; H04B 10/07953
See application file for complete search history.

(56) References Cited

U.S. PATENT DOCUMENTS 6,532,320 B1 * 3/2003 Kikuchi .................. H04L 25/14
385/24
7,167,651 B2 * 1/2007 Shpantzer .......... H04B 10/2563
398/205
(Continued)

FOREIGN PATENT DOCUMENTS

| CN | 1578205 A | 2/2005 |
|---|---|---|
| CN | 107359933 A | 11/2017 |
| JP | 2002057624 A | 2/2002 |

OTHER PUBLICATIONS

International Searching Authority. International Search Report and Written Opinion for PCT Application No. PCT/CN2021/099816 and English translation, dated Sep. 10, 2021, pp. 1-9.
(Continued)

*Primary Examiner* — Mina M Shalaby
(74) *Attorney, Agent, or Firm* — Vivacqua Crane, PLLC

(57) ABSTRACT

An optical signal processing method, a control unit, an optical transmission unit and a storage medium are disclosed. The optical signal processing method includes: acquiring an OSNR value from an optical receiving unit (S100); acquiring a spectrum shaping adjustment parameter according to the OSNR value (S200); and sending the spectrum shaping adjustment parameter to an optical transmission unit to adjust a filtering parameter of a shaping filter of the optical transmission unit, so that the optical transmission unit adjusts a spectrum waveform of an optical signal by utilizing the shaping filter after adjustment (S300).

14 Claims, 5 Drawing Sheets

(51) Int. Cl.
  *H04B 10/077* (2013.01)
  *H04B 10/079* (2013.01)
(52) U.S. Cl.
  CPC ... *H04B 10/0799* (2013.01); *H04B 10/07953* (2013.01); *H04B 10/2589* (2020.05)

(56) References Cited

U.S. PATENT DOCUMENTS

| | | | | |
|---|---|---|---|---|
| 9,800,326 | B2* | 10/2017 | Shoji | H04B 10/07957 |
| 10,069,590 | B1* | 9/2018 | Wang | H04B 10/25073 |
| 10,270,534 | B2* | 4/2019 | Eiselt | H04B 10/2507 |
| 10,644,821 | B1 | 5/2020 | Wang et al. | |
| 2003/0025957 | A1* | 2/2003 | Jayakumar | H04B 10/00 398/5 |
| 2009/0196602 | A1 | 8/2009 | Saunders et al. | |
| 2010/0266006 | A1* | 10/2010 | Werner | H04L 25/4906 375/232 |
| 2012/0183305 | A1* | 7/2012 | Umnov | H04B 10/0775 398/152 |
| 2015/0071641 | A1* | 3/2015 | Wen | H04J 14/02 398/193 |
| 2015/0110492 | A1* | 4/2015 | Yu | H04L 27/206 398/79 |
| 2016/0277118 | A1* | 9/2016 | Châtelain | H04B 10/25073 |
| 2017/0070286 | A1* | 3/2017 | Nishihara | H04J 14/0298 |
| 2018/0109318 | A1* | 4/2018 | Castro | H04B 10/2513 |
| 2019/0081826 | A1* | 3/2019 | Varughese | H04B 10/6971 |
| 2019/0173578 | A1* | 6/2019 | Smith | H04L 1/0046 |
| 2019/0326987 | A1* | 10/2019 | Noguchi | H04J 14/0298 |
| 2019/0342028 | A1* | 11/2019 | He | H04B 10/25073 |
| 2020/0052794 | A1* | 2/2020 | Noguchi | H04J 14/0298 |
| 2023/0106338 | A1* | 4/2023 | Sasai | H04B 10/2507 398/208 |

OTHER PUBLICATIONS

Webb, et al. "Adaptive Pulse Shaping Through BER Feedback," IEEE Journal of Lightwave Technology, vol. 27, No. 17, Sep. 2009, pp. 3765-3772.

European Patent Office. Extended European Search Report for EP Application No. 21826816.7, dated Jun. 6, 2023, pp. 1-11.

* cited by examiner

```
┌─────────────────────────────────────────────────────────────┐   S2100
│  Adjust a roll-off factor and a tap coefficient of the      │
│  shaping filter according to the spectrum shaping           │
│  adjustment parameter                                       │
└─────────────────────────────────────────────────────────────┘
```

Fig. 6

```
┌─────────────────────────────────────────────────────────────┐   S3100
│  Pre-emphasize the spectrum waveform of the optical signal  │
│  according to the adjusted roll-off factor and tap          │
│  coefficient of the shaping filter                          │
└─────────────────────────────────────────────────────────────┘
```

Fig. 7

```
┌─────────────────────────────────────────────────────────────┐   2200
│  When the spectrum shaping adjustment parameter from the    │
│  control unit is not received, maintain the current         │
│  filtering parameter of the shaping filter, so that the     │
│  optical transmission unit maintains a current spectrum     │
│  waveform of the optical signal                             │
└─────────────────────────────────────────────────────────────┘
```

Fig. 8

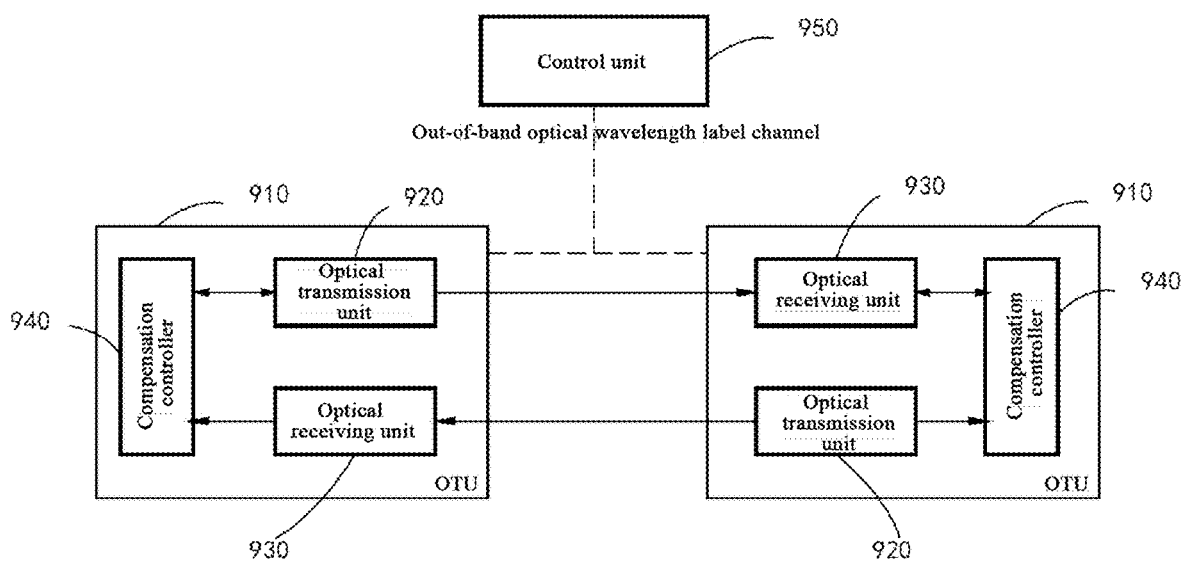

OPTICAL SIGNAL PROCESSING METHOD, CONTROL UNIT, OPTICAL TRANSMISSION UNIT AND STORAGE MEDIUM

CROSS-REFERENCE TO RELATED APPLICATION

This application is a national stage filing under 35 U.S.C. § 371 of international application number PCT/CN2021/099816, filed Jun. 11, 2021, which claims priority to Chinese patent application No. 202010543111.2 filed Jun. 15, 2020. The contents of these applications are incorporated herein by reference in their entirety.

TECHNICAL FIELD

Embodiments of the disclosure relate to, but are not limited to, the field of optical communication, and in particular to an optical signal processing method, a control unit, an optical transmission unit and a computer readable storage medium.

BACKGROUND

An Optical Transport Network (OTN) system is an important part of optical fiber communication. With the development of the optical fiber communication technology, a beyond 100G optical network based on coherent optical detection is widely used increasingly. Quadrature Phase Shift Keying (QPSK), Quadrature Amplitude Modulation (QAM) and other high-order modulation technologies are widely used in the beyond 100G optical network, which makes the baud rate of a single-carrier transmission signal higher. Therefore, the beyond 100G optical network has higher requirements for optical fiber links, so complex design and checking calculation are needed in the engineering design of the beyond 100G optical network. Moreover, when an optical fiber router or optical path index changes, even if an optical signal reaches a transmission performance degradation threshold, an OTN system can only passively generate a system alarm, but cannot adjust the transmission performance of the optical signal.

SUMMARY

The following is an overview of the subject described in detail in this article. This overview is not intended to limit the scope of protection of the claims.

Embodiments of the disclosure provide an optical signal processing method, a control unit, an optical transmission unit and a computer readable storage medium.

In accordance with an aspect of the disclosure, an embodiment provides an optical signal processing method, applied to a control unit, including: acquiring an OSNR value from an optical receiving unit; acquiring a spectrum shaping adjustment parameter according to the OSNR value; and sending the spectrum shaping adjustment parameter to an optical transmission unit to adjust a filtering parameter of a shaping filter of the optical transmission unit, so that the optical transmission unit adjusts a spectrum waveform of an optical signal by utilizing the shaping filter after adjustment.

In accordance with an aspect of the disclosure, an embodiment provides an optical signal processing method, applied to an optical transmission unit, including: receiving a spectrum shaping adjustment parameter from a control unit, where the spectrum shaping adjustment parameter is acquired by the control unit according to an OSNR value from an optical receiving unit; adjusting a filtering parameter of a shaping filter according to the spectrum shaping adjusting parameter; and adjusting a spectrum waveform of an optical signal by utilizing the shaping filter after adjustment.

In accordance with an aspect of the disclosure, an embodiment further provides a control unit, including: a memory, a processor, and a computer program stored in the memory and executable by the processor, where the computer program, when executed by the processor, causes the processor to carry out the optical signal processing method of the above-mentioned aspect.

In accordance with an aspect of the disclosure, an embodiment further provides an optical transmission unit, including: a memory, a processor, and a computer program stored in the memory and executable by the processor, where the computer program, when executed by the processor, causes the processor to carry out the optical signal processing method of the above-mentioned aspect.

In accordance with an aspect of the disclosure, an embodiment further provides a computer readable storage medium storing a computer executable instruction which, when executed by a processor, causes the processor to carry out the above-mentioned optical signal processing method.

Other features and advantages of the disclosure will be set forth in the following description, and partly become obvious from the description, or understood by implementing the disclosure. The objects and other advantages of the disclosure can be realized and obtained by the structure particularly pointed out in the description, claims and drawings.

BRIEF DESCRIPTION OF DRAWINGS

The drawings are provided for a further understanding of the technical schemes of the disclosure, and constitute a part of the description. The drawings and the embodiments of the disclosure are used to explain the technical schemes of the disclosure and do not constitute a limitation to the technical schemes of the disclosure.

FIG. 6 is a flowchart of adjusting a filtering parameter in an optical signal processing method provided by another embodiment of the disclosure;

FIG. 7 is a flowchart of adjusting a spectrum waveform in an optical signal processing method provided by another embodiment of the disclosure;

FIG. 8 is a flowchart of maintaining a current filtering parameter in an optical signal processing method provided by another embodiment of the disclosure;

FIG. 9 is a structural diagram of an OTN system adopting an optical signal processing method provided by another embodiment of the disclosure;

DETAILED DESCRIPTION

In order to make the objects, technical schemes and advantages of the disclosure clearer, the disclosure will be further described in detail with reference to the drawings and embodiments. It should be understood that the specific embodiments described here are only used to explain the disclosure, and are not used to limit the disclosure.

It should be noted that although functional modules are divided in the schematic diagram of the apparatus, and a logical sequence is shown in the flowchart, in some cases, they can be divided by modules different from those in the apparatus, or the steps shown or described are perform in the sequence in the flowchart. The terms "first", "second" and the like used in the description, claims or the above drawings are used for distinguishing similar objects, and are not necessarily used to describe a specific order or sequence.

Embodiments of the disclosure provide an optical signal processing method, a device, and a computer readable storage medium. The optical signal processing method includes: acquiring an OSNR value from an optical receiving unit; and controlling an optical transmission unit to adjust a filtering parameter of a shaping filter according to the OSNR value, so that the optical transmission unit adjusts a spectrum waveform of an optical signal by utilizing the shaping filter after adjustment. According to a scheme provided by an embodiment of the disclosure, an optical transmission unit may be controlled to adjust a filtering parameter of a shaping filter according to the OSNR value from the optical receiving unit, so that a spectrum waveform of an optical signal is adjusted, the punch-through cost is optimized, the ONSR cost of an optical channel is reduced, and the transmission performance of an OTN system is improved.

The embodiments of the disclosure will be further explained with reference to the accompanying drawings.

Figure 1:
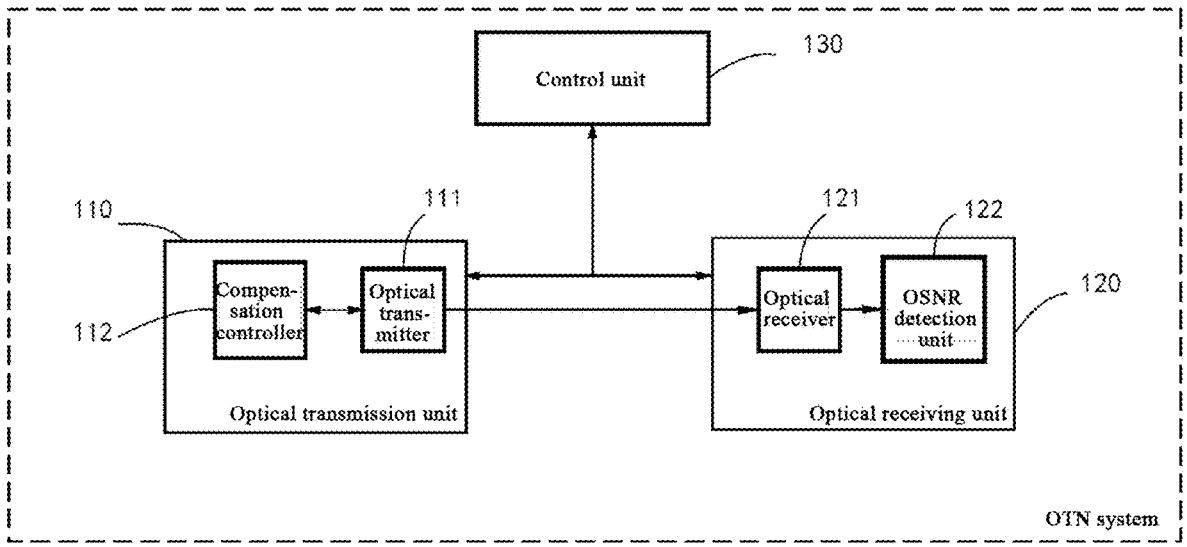
FIG. 1 is a schematic diagram of an OTN system configured to execute an optical signal processing method provided by one embodiment of the disclosure.

See FIG. 1, which is a schematic diagram of an OTN system configured to execute an optical signal processing method provided by one embodiment of the disclosure.

In an example in FIG. 1, the OTN system includes an optical transmission unit 110, an optical receiving unit 120 and a control unit 130, where the optical transmission unit 110 is communicatively connected with the optical receiving unit 120, and the optical transmission unit 110 is configured to send a modulated optical signal to the optical receiving unit 120 through an optical channel; the control unit 130 is communicatively connected with the optical transmission unit 110 and the optical receiving unit 120 respectively, that is, the control unit 130 can receive information from the optical receiving unit 120 and the optical transmission unit 110, and can also send control information to the optical receiving unit 120 and the optical transmission unit 110. A specific communication channel may be selected according to the actual demand, such as an out-of-band optical wavelength label channel or an optical monitoring channel, as long as it can realize information transmission.

Those having ordinary skill in the art can understand that the control unit 130 may be a device such as a system control platform, a server or the like, as long as it can realize data monitoring and processing, which is not specifically limited in this embodiment. In addition, the OTN system including the control unit may be applied to various optical transport network systems, for example, may be applied to a 100G optical transport network, or may be applied to a beyond 100G optical transport network, which is not specifically limited in this embodiment.

Those having ordinary skill in the art can understand that the OTN system elements shown in FIG. 1 do not constitute a limitation to the embodiment of the disclosure and may include more or fewer components than shown, or combinations of parts, or different component arrangements.

It should be noted that the optical transmission unit 110 and the optical receiving unit 120 of the embodiment of the disclosure may be components arranged in an Optical Transform Unit (OTU) or may be independent components, which is not specifically limited in this embodiment. It is worth noting that if the OTN system includes multiple groups of parallel optical channels, the control unit 130 may execute the optical signal processing method of the disclosure for the optical transmission unit 110 and the optical receiving unit 120 of each optical channel independently, or may adjust all OTUs uniformly, which is not specifically limited in this embodiment.

It should be noted that the optical transmission unit 110 may include an optical transmitter 111 and a compensation controller 112, where the optical transmitter 111 is configured to transmit a modulated and filtered optical signal, and the compensation controller 112 is configured to adjust a filtering parameter of a shaping filter according to an adjustment parameter of the spectrum waveform sent by the control unit 130. The compensation controller 112 may be an independent functional component, for example, may be a single chip microcomputer or a Field Programmable Gate Array (PFGA) chip, or may be a software functional module in the optical transmission unit 110, which is not specifically limited in this embodiment.

It should be noted that the optical receiving unit 120 may include an optical receiver 121 and an OSNR detection unit 122. The optical receiver 121 is configured to receive the optical signal from the optical transmitter 111. The OSNR detection unit 122 may acquire an OSNR value of an optical channel in the case where the optical receiver 121 receives the optical signal. The OSNR detection unit 122 may be an independent functional hardware, or a software functional module of the optical receiving unit 120, which is not specifically limited in this embodiment.

Based on the above control unit, various embodiments of the optical signal processing method of the disclosure are proposed below.

Figure 2:
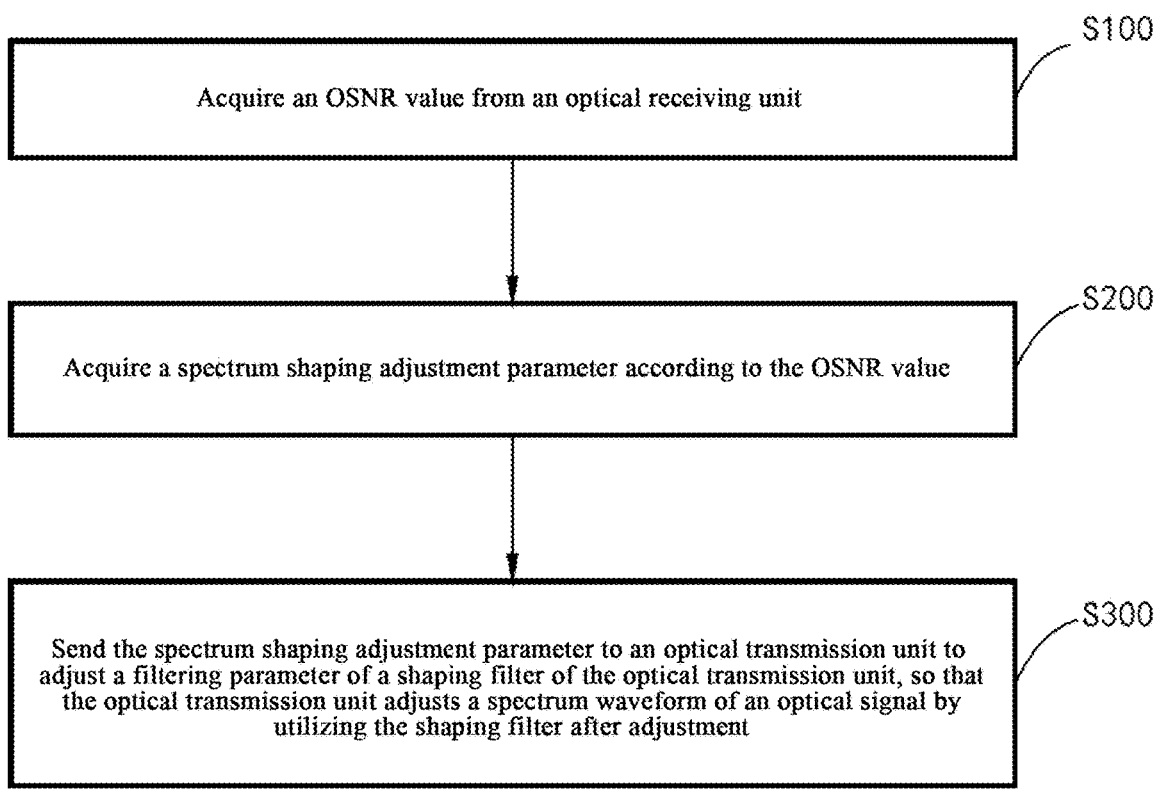
FIG. 2 is a flowchart of an optical signal processing method provided by one embodiment of the disclosure.

As shown in FIG. 2, which is a flowchart of an optical signal processing method provided by one embodiment of the disclosure, the optical signal processing method includes, but is not limited to, steps S100, S200 and S300.

At S100, an OSNR value from an optical receiving unit is acquired.

In an embodiment, the OSNR value may be acquired in real time, or may be acquired at a fixed time by setting a certain period of time, or may be acquired by manual operation, which may be selected according to the actual demand. For example, by adopting a scheme of acquiring the OSNR value in real time, the transmission performance of a current optical channel may be reflected in real time, and the spectrum waveform of the optical transmission unit may be adjusted in time when the transmission performance of the optical channel decreases, so as to ensure the transmission performance of the OTN system. It should be noted that since there are usually a plurality of OTUs and a large number of optical receiving units in the OTN system, the OSNR value from each optical receiving unit may be acquired by scanning, which is not limited in this embodiment.

In an embodiment, the OSNR value may be directly acquired by arranging the OSNR detection unit in the optical receiving unit, or may be obtained by sending a parameter used to calculate the OSNR value to the control unit for calculation. The parameter may be signal power of the optical channel, equivalent noise bandwidth, noise power, reference optical bandwidth, etc., which is not limited in this embodiment. It is worth noting that after the optical signal enters the optical receiving unit, processing such as coherent optical reception, dispersion compensation or the like is required to demodulate a data service signal finally, and parameters such as signal power, etc. are required for the acquisition of the OSNR value. The OSNR value may be acquired after the data service signal is demodulated to ensure the acquired OSNR value may accurately reflect the current transmission quality.

At S200, a spectrum shaping adjustment parameter is acquired according to the OSNR value.

In an embodiment, the shaping filter may be a pulse shaping filter or other shaping filters, as long as it can digitally filter the spectrum waveform of the optical signal, which is not limited in this embodiment. It is worth noting that spectrum shaping may be realized by adjusting a tap coefficient and a roll-off factor of the shaping filter, that is, pre-emphasizing the spectrum waveform of the output optical signal, so as to adjust the shape of the spectrum waveform and compensate the OSNR cost loss of an optical fiber link.

At S300, the spectrum shaping adjustment parameter is sent to the optical transmission unit to adjust a filtering parameter of a shaping filter of the optical transmission unit, so that the optical transmission unit adjusts a spectrum waveform of an optical signal by utilizing the shaping filter after adjustment.

In an embodiment, high-order modulation technologies such as QPSK, 8QAM, 16QAM, 32QAM and 64QAM are widely used in the beyond 100G optical network, which makes the baud rate of a single-carrier transmission signal higher. When an optical fiber router or optical path index changes, the transmission performance is greatly affected. The transmission performance of a high-order modulation OTN system is related to a repeaterless transmission distance. Increasing the repeaterless transmission distance may be realized by reducing the ONSR cost of an optical channel. The ONSR cost of the optical channel is mainly composed of a punch-through cost of a service optical signal and a nonlinear distortion cost. The effect of spectrum shaping may be realized by adjusting the spectrum waveform of the optical signal, thus reducing the punch-through cost of the optical channel and then improving the transmission performance.

Figure 3:
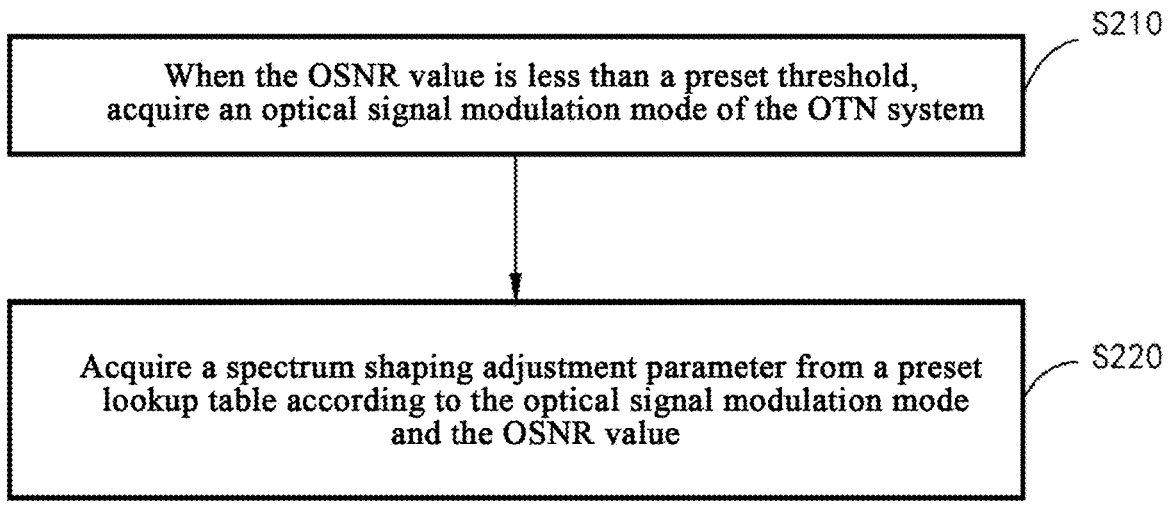
FIG. 3 is a flowchart of acquiring a spectrum shaping adjustment parameter in an optical signal processing method provided by another embodiment of the disclosure.

In addition, referring to FIG. 3, in an embodiment, step S200 includes, but is not limited to, the following steps:

At S210, when the OSNR value is less than a preset threshold, an optical signal modulation mode of the OTN system is acquired; and At S220, a spectrum shaping adjustment parameter is acquired from a preset lookup table according to the optical signal modulation mode and the OSNR value.

In an embodiment, the preset threshold may be any value. For example, in the case where a transmission performance degradation threshold of the OTN system is used as the preset threshold, and the OSNR value is less than the transmission performance degradation threshold, the optical signal cannot be transmitted normally. Therefore, it is necessary to adjust the filtering parameter in time to adjust the spectrum waveform in real time, improve the transmission performance of the optical signal in the optical channel, and ensure the normal transceiving of the OTN system. A value larger than the transmission performance degradation threshold may be selected as the preset threshold as well to keep the OTN system be in a normal transmission state, and the specific value may be selected according to the actual demand.

In an embodiment, the spectrum shaping adjustment parameter may be an adjustment amount or may be a new filtering parameter configured to replace the current filtering parameter, and the specific type may be selected according to the actual demand. For example, if the spectrum shaping adjustment parameter is an adjustment amount, the adjusted filtering parameter is obtained by adding the current filtering parameter and the spectrum shaping adjustment parameter, and the shaping filter filters the optical signal according to the adjusted filtering parameter. For another example, if the spectrum shaping adjustment parameter is a new filtering parameter, the optical transmission unit replaces the currently used filtering parameter with the new filtering parameter, and adjusts the spectrum waveform of the optical signal by means of the new filtering parameter. It is worth noting that when the spectrum shaping adjustment parameter is an adjustment amount, the adjustment amount may be a fixed value, or may be a variable, for example, a function related to a time domain. The specific type of the adjustment amount may be selected according to the actual demand, as long as it can realize the adjustment of the filtering parameter.

In an embodiment, the optical signal modulation mode may be acquired by route analysis, for example, may be determined by acquiring the current transmission fiber type, the optical link status and the performance indexes of optical transmission and optical reception by the control unit. It should be noted that the optical signal modulation mode may be any type of high-order modulation mode, such as the phase modulator (PM) used in the beyond 100G optical network, which may be PM-8QAM, PM-16QAM or PM-QPSK. Because when the OTN system is in different optical signal modulation modes, the operating states of optical receiving units are different, and adjusting filter parameters may achieve different OSNR optimization effects, when acquiring the spectrum shaping adjustment parameter through the OSNR value, and taking the optical signal modulation modes as reference data for matching in the lookup table, for example, when the optical modulation modes are PM-8QAM, PM-16QAM and PM-QPSK respectively, in the case where the OSNR values from the optical receiving units are identical and all the service rates are 200G, the spectrum shaping adjustment parameters acquired by means of the lookup table are different from each other, so that the filtering parameters may be respectively applied to corresponding optical modulation modes after adjustment, achieving better transmission performance. The corresponding spectrum shaping adjustment parameters in each optical modulation mode may be selected according to the actual requirements of the OTN system.

In an embodiment, the spectrum shaping adjustment parameter acquired according to the OSNR value and the optical modulation mode may be matched through a lookup table or may be calculated through a preset formula. It should be noted that if the spectrum shaping parameter is acquired through a preset lookup table, a specific value or variable corresponding to the OSNR value may be set in the lookup table, and the value or variable may be used as the spectrum shaping adjustment parameter, or may be selected according to the actual demand by setting a calculation formula corresponding to the OSNR value in the lookup table.

Figure 4:
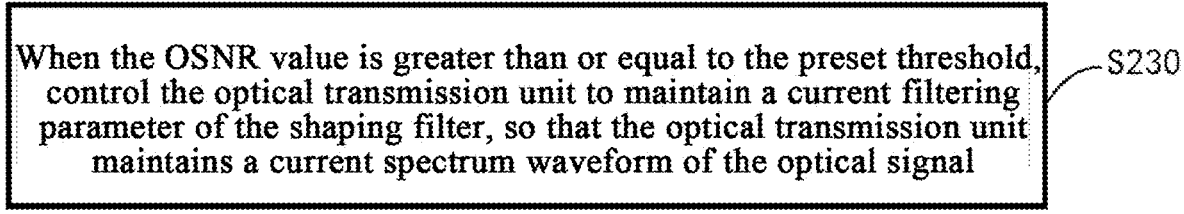
FIG. 4 is a flowchart of maintaining a current filtering parameter in an optical signal processing method provided by another embodiment of the disclosure.

In addition, referring to FIG. 4, in an embodiment, step S200 includes, but is not limited to, the following steps:

At S230, when the OSNR value is greater than or equal to the preset threshold, the optical transmission unit is controlled to maintain a current filtering parameter of the shaping filter, so that the optical transmission unit maintains a current spectrum waveform of the optical signal.

Based on the above embodiment, since the OSNR value is a performance index of the optical channel transmission quality, in the case where the preset threshold is a transmission performance degradation threshold of the OTN system, if the OSNR value is greater than or equal to the preset threshold, the optical channel transmission performance of the OTN system meets the transmission requirements, so the current filtering parameter of the shaping filter may be maintained or the filtering parameter may be further adjusted, so that the OSNR value may meet higher optical transmission requirements. The specific adjustment method may be selected according to the actual demand.

It is worth noting that in order to maintain the current filtering parameter of the shaping filter, an instruction to maintain the filtering parameter may be sent to the optical transmission unit, or no instruction may be sent to the optical transmission unit. In the case where the optical transmission unit does not receive the instruction, a corresponding adjustment may not be made, thus maintaining the current filtering parameter of the shaping filter.

In addition, in an embodiment, the OSNR value includes an OSNR tolerance value of the optical receiving unit, an OSNR cost of the optical channel and an OSNR redundancy of the OTN system. The preset threshold is acquired through the following formula: $Y_0=k_1X_1+k_2X_2 \ k_3X_3+\Delta$, where $Y_0$ is the preset threshold, $X_1$ is the OSNR tolerance value, $X_2$ is the OSNR cost, $X_3$ is the OSNR redundancy, $k_1$, $k_2$ and $k_3$ are preset check coefficients, and $\Delta$ is a preset check offset.

In an embodiment, the OSNR value may include any value type related to OSNR, such as OSNR tolerance value of the optical receiving unit, OSNR cost of the optical channel or OSNR redundancy of the OTN system, and the specific value type may be selected according to the actual demand.

Based on the above embodiment, the preset threshold may be calculated through any formula. For example, in the case where the OSNR value includes the OSNR tolerance value of the optical receiving unit, the OSNR cost of the optical channel and the OSNR redundancy of the OTN system, the preset threshold may be calculated through the following formula: $Y_0=k_1X_1+k_2X_2+k_3X_3+\Delta$, where $k_1$, $k_2$ and $k_3$ are preset check coefficients, which can take any value. For example, if $k_1$, $k_2$ and $k_3$ are all set to 1, then the weights of the OSNR tolerance value of the optical receiving unit, the OSNR cost of the optical channel and the OSNR redundancy of the OTN system are identical, and the actual value may be selected according to the weights of the above three in the optical transmission link. It is worth noting that $\Delta$ is a preset check offset, that is, a preset threshold in the case where $X_1$, $X_2$ and $X_3$ are all 0. Based on this, $\Delta$ may be the transmission performance degradation threshold of the OTN system, and the specific value may be selected according to the actual demand.

In addition, in an embodiment, the OSNR value and the spectrum shaping adjustment parameter may be transmitted through an out-of-band optical wavelength label channel or through an optical monitoring channel.

It is worth noting that the OSNR value may be transmitted through any channel directly connected between the control unit and the OUT. For example, the out-of-band optical wavelength label channel is directly connected between the control unit and the OTU, while the optical receiving unit is arranged in the OTU, so the OSNR value may be sent from the optical receiving unit to the control unit through this channel. For another example, the OTN system includes a plurality of optical monitoring platforms configured to acquire the data of optical channels to ensure the normal operation of the OTN system. Therefore, if the OTU, the optical monitoring platform and the control unit can communicate with each other, the optical monitoring platform can be configured to send the OSNR value. Of course, the OSNR value may be acquired through other types of channels, which may be selected according to the actual demand.

Figure 5:
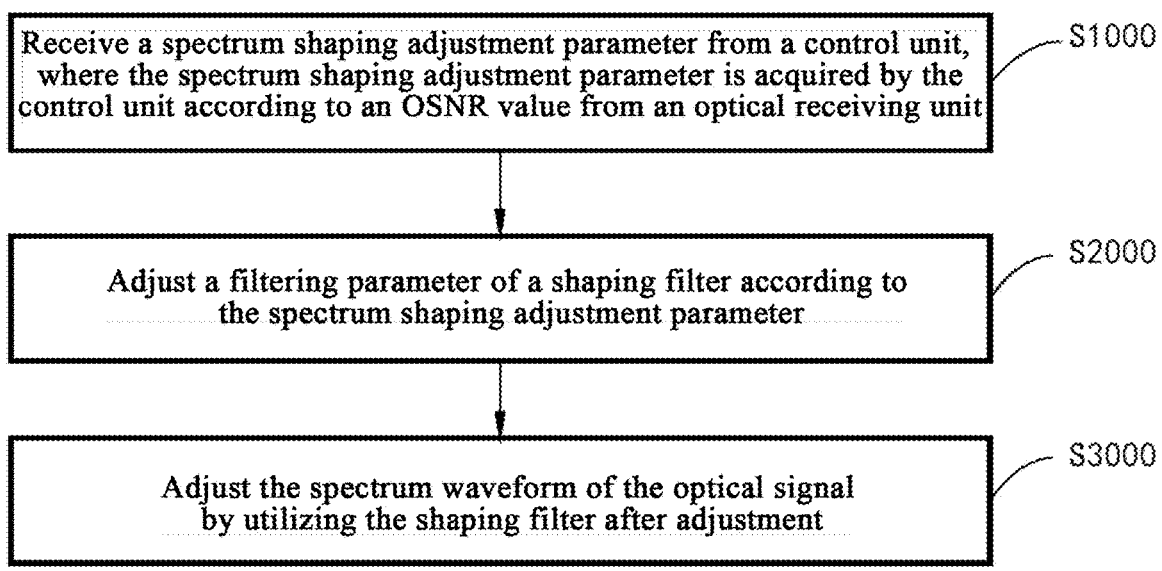
FIG. 5 is a flowchart of an optical signal processing method provided by another embodiment of the disclosure.

As shown in FIG. 5, which is a flowchart of an optical signal processing method provided by one embodiment of the disclosure, the optical signal processing method includes, but is not limited to, steps S1000, S2000 and S3000.

At S1000, a spectrum shaping adjustment parameter from a control unit is received, where the spectrum shaping adjustment parameter is acquired by the control unit according to an OSNR value from an optical receiving unit.

In an embodiment, the spectrum shaping adjustment parameter may be acquired by the control unit of the OTN system according to the OSNR value from the optical receiving unit. The specific principle may refer to that in the embodiment shown in FIG. 3, which will not be repeated here.

At S2000, a filtering parameter of a shaping filter is adjusted according to the spectrum shaping adjustment parameter.

In an embodiment, after a compensation controller receives the spectrum shaping adjustment parameter, the filtering parameter may be adjusted in real time, so that a spectrum waveform of an optical signal from the optical transmission unit may be adjusted in real time to ensure that the transmission performance of the OTN system meets requirements.

At S3000, the spectrum waveform of the optical signal is adjusted by utilizing the shaping filter after adjustment.

In an embodiment, the shaping filter may be any type of shaping filter, such as a pulse shaping filter. Filtering the spectrum waveform of the optical signal by the pulse shaping filter may achieve the effect of spectrum shaping, and reduce the punch-through cost of the optical channel, thereby reducing the OSNR cost of the optical channel and increasing the repeaterless transmission distance.

It should be noted that the optical signal processing method of this embodiment is substantially identical to that of the embodiment shown in FIG. 2, and the main difference is that the execution subject of the optical signal processing method of the embodiment shown in FIG. 2 is the control unit of the OTN system, while the execution subject of the optical signal processing method of this embodiment is the optical transmission unit. For the sake of brevity, similar principles will not be described in detail later.

In addition, referring to FIG. 6, in an embodiment, step S2000 includes, but is not limited to, the following step:

At S2100, a roll-off factor and a tap coefficient of the shaping filter are adjusted according to the spectrum shaping adjustment parameter.

In an embodiment, the roll-off factor and tap coefficient may be adjusted simultaneously according to the spectrum shaping parameter, or only one of the parameters may be adjusted and selected according to the actual demand, as long as it can meet the transmission requirements after adjustment.

In addition, referring to FIG. 7, in an embodiment, step S3000 includes, but is not limited to, the following step:

At S3100, the spectrum waveform of the optical signal is pre-emphasized according to the adjusted roll-off factor and tap coefficient of the shaping filter.

In an embodiment, by adjusting the roll-off factor and tap coefficient, the spectrum waveform of the optical signal may be changed, and any shaping effect may be achieved, for example, the effect equivalent to pre-emphasis treatment in spectrum characteristic may be achieved, so as to compensate the OSNR cost loss of the optical fiber link.

In addition, in an embodiment, the spectrum shaping adjustment parameter may be transmitted through an out-of-band optical wavelength label channel or through an optical monitoring channel.

It is worth noting that the principle of acquiring the spectrum shaping adjustment parameter through the out-of-band optical wavelength label channel or the optical monitoring channel is similar to that of the embodiment shown in FIG. 6, which will not be repeated here.

In addition, referring to FIG. 8, in an embodiment, step S2000 includes, but is not limited to, the following step:

At S2200, when the spectrum shaping adjustment parameter from the control unit is not received, the current filtering parameter of the shaping filter is maintained, so that the optical transmission unit maintains a current spectrum waveform of the optical signal.

In an embodiment, when the OSNR value from the optical receiving unit is greater than or equal to the preset threshold, the principle of maintaining the current filtering parameter of the shaping filter is similar to that of the embodiment shown FIG. 4, which will not be repeated here.

In addition, referring to FIG. 9, which is a structural schematic diagram of an OTN system configured to execute an optical signal processing method provided by another embodiment of the disclosure, a technical scheme of the embodiment of the disclosure is illustrated by a specific example below.

Figure 10A:
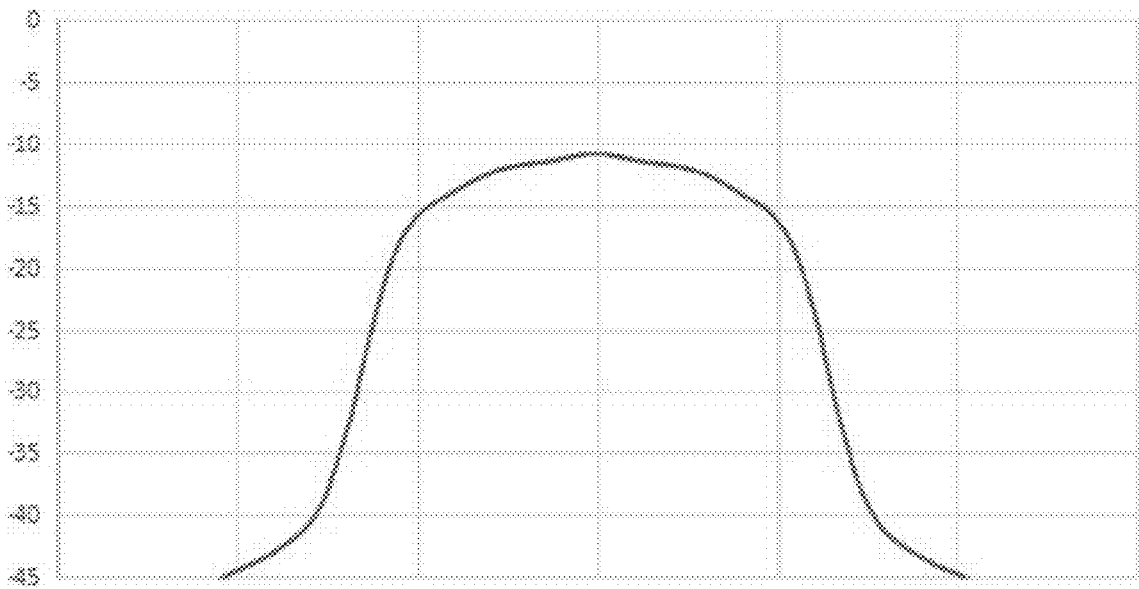
FIG. 10A is a diagram of a spectrum waveform of an optical signal before filtering provided by another embodiment of the disclosure.
Figure 10B:
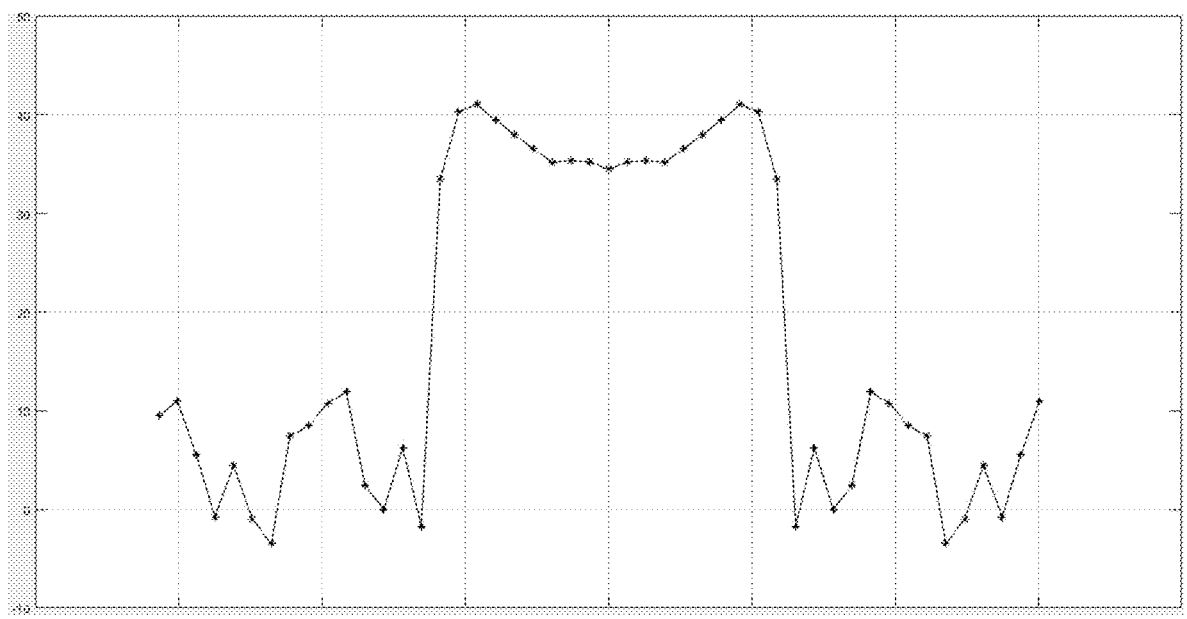
FIG. 10B is a diagram of a spectrum waveform of an optical signal after filtering provided by another embodiment of the disclosure.

As shown in FIG. 9, the OTN system includes a plurality of OTUs 910. The OUT 910 includes a plurality of optical transmission units 920, a plurality of optical receiving units 930 and a compensation controller 940, and further includes a control unit 950. The control unit 950 can perform data exchange with the OTU through an out-of-band optical wavelength label channel. The output of the optical receiving unit 930 is connected to the compensation controller 940, and the optical transmission unit 920 is bidirectionally connected with the compensation controller 940. Before the optical transmission unit 920 starts to transmit an optical signal, the control unit 950 acquires a preset initial filtering parameter and sends the preset initial filtering parameter to the compensation controller 940. The compensation controller 940 adjusts the a filtering parameter of the shaping filter according to the initial filtering parameter, filters the optical signal and then transmits the optical signal to the optical receiving unit 930, the spectrum waveform of the optical signal being shown in FIG. 10A. The optical receiving unit 930 receives the optical signal and then performs OSNR detection, and sends the acquired OSNR value to the system controller 950 through the out-of-band optical wavelength label channel, where the OSNR value includes an OSNR tolerance value of the optical receiving unit, an OSNR cost of an optical channel and an OSNR redundancy of the OTN system. After receiving the OSNR value, the system controller 950 compares the OSNR value with a preset threshold, maintains the current filtering parameter if the OSNR value is greater than or equal to the preset threshold, acquires an optical signal modulation mode of the OTN system if the OSNR value is less than the preset threshold, acquires a spectrum shaping adjustment parameter from a preset lookup table according to the optical signal modulation mode and the OSNR value, and sends the spectrum shaping adjustment parameter to the compensation controller 940. After receiving the spectrum shaping adjustment parameter, the compensation controller 940 adjusts a roll-off factor and a tap coefficient of the shaping filter according to the spectrum shaping adjustment parameter, so that the optical transmission unit 920 adjusts the spectrum waveform of the optical signal by utilizing the shaping filter after adjustment, the spectrum waveform of the optical signal being shown in FIG. 10B, which achieves the effect of pre-emphasis in spectrum characteristic, where the horizontal axis of the coordinate axis in FIGS. 10A and 10B represents time, and the vertical axis represents the frequency of the optical signal. By adopting the technical scheme of this embodiment, the spectrum shaping adjustment parameter may be acquired according to the OSNR value from the optical receiving unit 930, so as to adjust the spectrum waveform of the optical signal transmitted by the optical transmission unit 920, realize the optical channel compensation, effectively reduce the punch-through cost, compensate the loss of OSNR cost, and increase the repeaterless transmission distance, thus improving the transmission performance of the OTN system.

Figure 11:
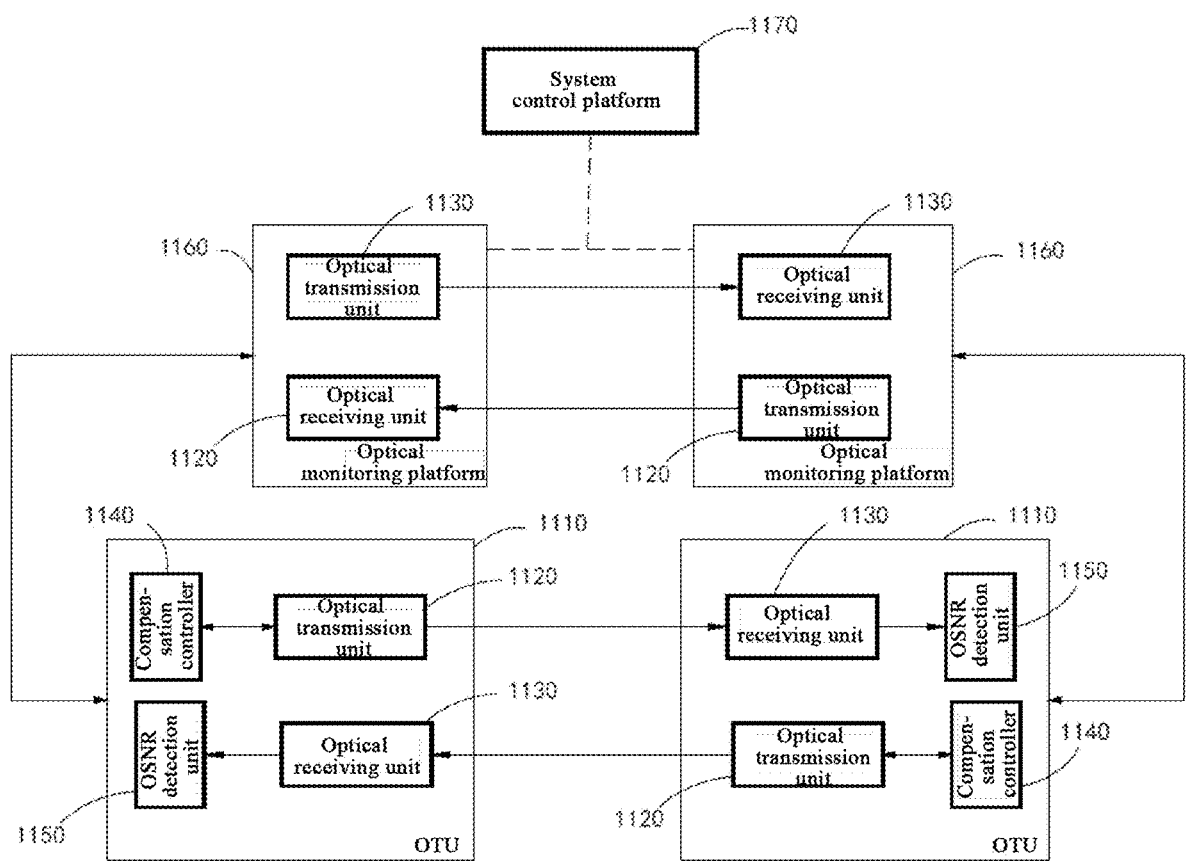
FIG. 11 is a structural diagram of an OTN system adopting an optical signal processing method provided by another embodiment of the disclosure.

In addition, referring to FIG. 11, which is a structural schematic diagram of an OTN system configured to execute an optical signal processing method provided by another embodiment of the disclosure, the OTN system in FIG. 11 includes a plurality of OTUs 1110. The OUT 1110 includes a plurality of optical transmission units 1120, a plurality of optical receiving units 1130, a compensation controller 1140, an OSNR detection unit 1150, an optical monitoring platform 1160 and a control unit 1170, where the optical transmission unit 1120 is bidirectionally connected with the compensation controller 1140, the optical receiving unit 1130 is connected with the OSNR detection unit 1150, the optical monitoring platform 1160 is connected with the OUT 1110 and is configured to acquire data in the OTU 110 and send a spectrum shaping adjustment parameter to the compensation controller 1140, and the control unit 1170 is communicatively connected with the optical monitoring platform 1160.

The specific principle of the embodiment shown in FIG. 11 is similar to that of the embodiment shown in FIG. 9, and the main difference is that the OSNR value from the OTU and the spectrum shaping adjustment parameter are communicated to the control unit 1170 through a channel of the optical monitoring platform 1160. The OSNR value, spectrum shaping adjustment parameter, and principle and filtering effect of adjusting the filtering parameter are similar to those in the embodiment shown in FIG. 9, which will not be repeated here.

In addition, an embodiment of the disclosure further provides a control unit, including: a memory, a processor, and a computer program stored in the memory and running on the processor.

The processor and the memory may be connected by a bus or other means.

It should be noted that the control unit in this embodiment can form a part of the OTN system in the embodiment shown in FIG. 1. These embodiments all belong to the same inventive concept, so these embodiments have the same implementation principle and technical effect, which will not be described in detail here.

A non-transient software program and instruction required to implement the optical signal processing method of the above embodiment are stored in the memory, and when the non-transient software program and instruction are executed by the processor, the optical signal processing method applied to the control unit in the above embodiment is executed, for example, the above-described method steps S100 to S300 in FIG. 2, method steps S210 to S220 in FIG. 3, and method step S230 in FIG. 4 are executed.

In addition, an embodiment of the disclosure further provides an optical transmission unit, the optical transmission unit including: a memory, a processor, and a computer program stored in the memory and running on the processor.

The processor and the memory may be connected by a bus or other means.

It should be noted that the optical transmission unit in this embodiment can form a part of the OTN system in the embodiment shown in FIG. 1. These embodiments all belong to the same inventive concept, so these embodiments have the same implementation principle and technical effect, which will not be described in detail here.

A non-transient software program and instruction required to implement the optical signal processing method of the above embodiment are stored in the memory, and when the non-transient software program and instruction are executed by the processor, the optical signal processing method applied to the optical transmission unit in the above embodiment is executed, for example, the above-described method steps S1000 to S3000 in FIG. 5, method step S2100 in FIG. 6, method step S3100 in FIG. 7, and method step S2200 in FIG. 8 are executed.

The device embodiments described above are merely illustrative, and the units described as separate components may or may not be physically separated, that is, may be located in one place, or may be distributed onto multiple network elements. Some or all of the modules may be selected according to the actual demand to achieve the purpose of this embodiment.

In addition, an embodiment of the disclosure further provides a computer readable storage medium storing a computer executable instruction. The computer executable instruction, when executed by one processor or controller, for example, by one processor in the embodiment of the above-mentioned control unit, causes the processor to execute the optical signal processing method applied to the control unit in the above-mentioned embodiment, for example, execute the above-described method steps S100 to S300 in FIG. 2, method steps S210 to S220 in FIG. 3, and method step S230 in FIG. 4; or, when executed by one processor in the embodiment of the optical transmission unit, causes the processor to execute the optical signal processing method applied to the optical transmission unit in the above-mentioned embodiment, for example, execute the above-described method steps S1000 to S3000 in FIG. 5, method step S2100 in FIG. 6, method step S3100 in FIG. 7 and method step S2200 in FIG. 8.

An embodiment of the disclosure includes: acquiring an OSNR value from an optical receiving unit; acquiring a spectrum shaping adjustment parameter according to the OSNR value; and sending the spectrum shaping adjustment parameter to an optical transmission unit to adjust a filtering parameter of a shaping filter of the optical transmission unit, so that the optical transmission unit adjusts a spectrum waveform of an optical signal by utilizing the shaping filter after adjustment. According to a scheme provided by an embodiment of the disclosure, a control unit may control the optical transmission unit to adjust a filtering parameter of a shaping filter according to the OSNR value from the optical receiving unit, so that the optical transmission unit may adjust a spectrum waveform of an optical signal, improving the transmission performance of an OTN system.

As will be understood by those having ordinary skill in the art that all or some of the steps in the method and systems disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As is well known to those having ordinary skill in the art, the term computer storage medium includes volatile and nonvolatile, removable and non-removable media implemented in any method or technology for storing information such as computer readable instructions, data structures, program modules or other data. A computer storage medium may include RAM, ROM, EEPROM, flash memory or other memory technologies, CD-ROM, digital versatile disk (DVD) or other optical disk storage, magnetic cassette, magnetic tape, magnetic disk storage or other magnetic storage devices, or any other media that can be used to store desired information and can be accessed by a computer. In addition, it is well known to those having ordinary skill in the art that the communication medium may generally include computer readable instructions, data structures, program modules or other data in a modulated data signal such as a carrier wave or other transmission mechanism, and may include any information delivery medium.

The above is a detailed description of some embodiments of the disclosure, but the disclosure is not limited to the above embodiments. Those familiar with this field can also make various equivalent modifications or substitutions without violating the scope of the disclosure, and these equivalent modifications or substitutions are included in the scope defined by the claims of the disclosure.

The invention claimed is:

1. An optical signal processing method, applied to a control unit, comprising:
acquiring an optical signal noise ratio (OSNR) value from an optical receiving unit;
acquiring a spectrum shaping adjustment parameter according to the OSNR value; and
sending the spectrum shaping adjustment parameter to an optical transmission unit to adjust a filtering parameter of a shaping filter of the optical transmission unit, so that the optical transmission unit adjusts a spectrum waveform of an optical signal by utilizing the shaping filter after adjustments;
wherein the acquiring the spectrum shaping adjustment parameter according to the OSNR value comprises:
in response to that the OSNR value is less than a preset threshold, acquiring an optical signal modulation mode of an optical transport network (OTN) system; and acquiring the spectrum shaping adjustment parameter from a preset lookup table according to the optical signal modulation mode and the OSNR value.

2. The optical signal processing method of claim 1, further comprising:
   in response to that the OSNR value is greater than or equal to the preset threshold, controlling the optical transmission unit to maintain a current filtering parameter of the shaping filter, so that the optical transmission unit maintains a current spectrum waveform of the optical signal.

3. The optical signal processing method of claim 1, wherein
   the OSNR value includes an OSNR tolerance value of the optical receiving unit, an OSNR cost of an optical channel, and an OSNR redundancy of the OTN system,
   wherein the preset threshold is acquired through the following formula: $Y_0 = k_1 X_1 + k_2 X_2 + k_3 X_3 + \Delta$;
   wherein $Y_0$ is the preset threshold, $X_1$ is the OSNR tolerance value, $X_2$ is the OSNR cost, $X_3$ is the OSNR redundancy, $k_1$ $k_2$ and $k_3$ are preset check coefficients, and $\Delta$ is a preset check offset.

4. The optical signal processing method of claim 1, wherein the acquiring an OSNR value from an optical receiving unit comprises:
   acquiring the OSNR value through an out-of-band optical wavelength label channel; or,
   acquiring the OSNR value through an optical monitoring channel of the OTN system.

5. The optical signal processing method of claim 1, wherein the sending the spectrum shaping adjustment parameter to an optical transmission unit to adjust a filtering parameter of the shaping filter of the optical transmission unit comprises:
   sending the spectrum shaping adjustment parameter to the optical transmission unit through an out-of-band optical wavelength label channel to adjust the filtering parameter of the shaping filter of the optical transmission unit; or,
   sending the spectrum shaping adjustment parameter to the optical transmission unit through an optical monitoring channel of the OTN system to adjust the filtering parameter of the shaping filter of the optical transmission unit.

6. An optical signal processing method, applied to an optical transmission unit, comprising:
   receiving a spectrum shaping adjustment parameter from a control unit,
       wherein the spectrum shaping adjustment parameter is acquired by the control unit from a preset lookup table according to an optical signal noise ratio (OSNR) value from an optical receiving unit and an optical signal modulation mode of an optical transport network (OTN) system;
   adjusting a filtering parameter of a shaping filter according to the spectrum shaping adjustment parameter; and
   adjusting a spectrum waveform of an optical signal by utilizing the shaping filter after adjustment.

7. The optical signal processing method of claim 6, wherein the adjusting a filtering parameter of a shaping filter according to the spectrum shaping adjustment parameter comprises:
   adjusting a roll-off factor and a tap coefficient of the shaping filter according to the spectrum shaping adjustment parameter.

8. The optical signal processing method of claim 7, wherein the adjusting a spectrum waveform of an optical signal by utilizing the shaping filter after adjustment comprises:
   pre-emphasizing the spectrum waveform of the optical signal according to the adjusted roll-off factor and tap coefficient of the shaping filter.

9. The optical signal processing method of claim 6, wherein the receiving a spectrum shaping adjustment parameter from a control unit comprises:
   receiving the spectrum shaping adjustment parameter from the control unit through an out-of-band optical wavelength label channel or an optical monitoring channel of the (OTN) system.

10. The optical signal processing method of claim 6, further comprising:
    in response to that the spectrum shaping adjustment parameter from the control unit is not received,
    maintaining a current filtering parameter of the shaping filter, so that the optical transmission unit maintains a current spectrum waveform of the optical signal.

11. A control unit, comprising:
    a memory,
    a processor, and
    a computer program stored in the memory and executable by the processor,
        wherein the computer program, when executed by the processor, causes the processor to carry out the optical signal processing method of claim 1.

12. An optical transmission unit, comprising:
    a memory,
    a processor, and
    a computer program stored in the memory and executable by the processor,
        wherein the computer program, when executed by the processor, causes the processor to carry out the computer program, causes the processor to carry out the optical signal processing method of claim 7.

13. A non-transitory computer readable storage medium storing a computer executable instruction which, when executed by a processor, causes the processor to carry out the optical signal processing method of claim 1.

14. A non-transitory computer readable storage medium storing a computer executable instruction which, when executed by a processor, causes the processor to carry out the optical signal processing method of claim 6.

* * * * *